United States Patent [19]
Molloy

[11] 3,863,738
[45] Feb. 4, 1975

[54] COMBINED DRAINING AND BRAKE ADJUSTMENT MEANS FOR A BAND BRAKE ASSEMBLY

[75] Inventor: Gerald F. Molloy, Aurora, Ill.

[73] Assignee: Caterpillar Tractor Co., Peoria, Ill.

[22] Filed: Feb. 1, 1974

[21] Appl. No.: 438,597

[52] U.S. Cl. ............................. 188/77 R, 251/144
[51] Int. Cl. ............................................ F16d 51/04
[58] Field of Search .................. 188/77 R; 251/144; 248/188.4, 405

[56] References Cited
UNITED STATES PATENTS
| | | | |
|---|---|---|---|
| 2,678,703 | 5/1954 | Williams et al. | 188/77 R |
| 2,854,858 | 10/1958 | Butterfield et al. | 177/77 R |
| 3,756,564 | 9/1973 | Murray et al. | 188/77 R |

Primary Examiner—Trygve M. Blix
Assistant Examiner—Edward Kazenske
Attorney, Agent, or Firm—Phillips, Moore, Weissenberger, Lempio & Strabala

[57] ABSTRACT

A band brake assembly is mounted in a case and comprises a rotatable drum and a flexible band with internal lining substantially circumventing the drum for selective frictional engagement therewith by a suitable actuator. A drain plug is threadably mounted on a bottom wall of the case and an adjustable cap screw is threadably mounted in the drain plug to have its head end position in close proximity to the band for band supporting purposes.

7 Claims, 2 Drawing Figures

COMBINED DRAINING AND BRAKE ADJUSTMENT MEANS FOR A BAND BRAKE ASSEMBLY

BACKGROUND OF THE INVENTION

Track-type tractors oftentimes employ dry steering clutches and brakes for selectively steering the tractor. The leakage of oil into the case, containing such clutches and brakes, will cause the same to malfunction unless the oil is periodically removed therefrom. Elaborate welding and other sealing techniques have been employed to prevent such leakage.

The band brake assembly, normally employed for the abovetype of steering brake, normally includes an adjustment member, such as that shown in U.S. Pat. No. 2,854,858, threadably mounted on a case thereof to insure uniform braking contact. However, such adjustment member has a limited thread support on the housing and projects exteriorly thereof to subject it to possible inadvertent misadjustment. Furthermore, the adjustment member, when removed for drainage purposes, requires complete readjustment thereof upon reinstallation.

SUMMARY OF THE INVENTION

An object of this invention is to provide an economical and non-complex means for simultaneously draining the housing for a band brake assembly and for adjusting the brake assembly.

The band brake assembly comprises a rotatable drum, a flexible band having its internal lining at least partially circumventing the drum for selective frictional engagement therewith and actuating means connected to the band to clamp and frictionally engage the lining with the drum. The combined draining and brake adjustment means comprises a drain plug threadably mounted exteriorly of a bottom wall of the housing and band brake adjustment means threadably mounted on the drain plug to dispose an adjustment end thereof in close proximity to the band to insure uniform braking contact.

BRIEF DESCRIPTION OF THE DRAWINGS

Other objects of this invention will become apparent from the following description and accompanying drawings wherein.

DETAILED DESCRIPTION

Figure 1:
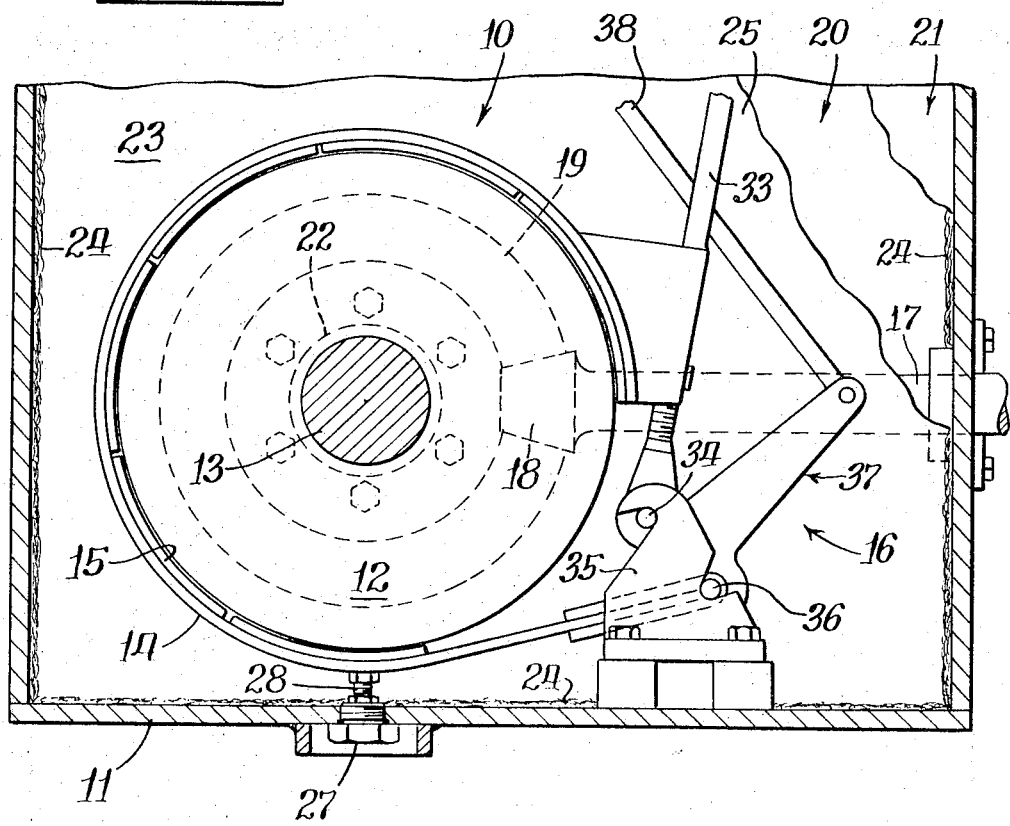
FIG. 1 is a partially sectioned, side elevational view of a band brake assembly in combination with a final drive for a track-type tractor.

Referring to FIG. 1, a band brake assembly 10 is shown mounted and enclosed within a partially illustrated stationary housing 11. The band brake assembly comprises a drum 12 mounted for rotation on a cross shaft 13. A flexible steel band 14, having a segmented brake lining 15 secured internally thereon, substantially circumvents the drum to selectively frictionally engage the brake lining therewith under the control of an actuating means 16 operatively connected to the band.

The brake band assembly may be employed in the final drive of a track-type tractor wherein a power input shaft 17 is adapted to selectively rotate the drum by gear means comprising a transmission pinion 18 and a meshing bevel face gear 19 mounted on cross-shaft 13, all contained in a closed compartment or chamber 20. The cross-shaft, in turn, provides the power output to drive a sprocket and endless track of the vehicle (not shown). A band brake assembly is selectively actuated to steer the vehicle in a conventional manner along with an operatively associated steering clutch (not shown), contained in each of two spaced and closed compartments or chambers 21 and 23.

The drive train, comprising drive shaft 17 and gears 18 and 19, constantly requires lubrication whereby lubricating oil accumulates in central chamber 20. A sump is normally provided to return the lubricating oil to a common lube system. An annular seal, schematically illustrated at 22, is provided around cross-shaft 13 to prevent the ingress of lubricating oil into compartment or chamber 23, containing the band brake assembly therein.

Such seal, along with corner weldments 24 at the edges of a common plate 25 isolating chambers 20 and 23, function to prevent any substantial seepage of oil into chamber 23. However, some lubricating oil will normally seep into chamber 23 from chamber 20 and will accumulate in chamber 23 whereby the function of the dry-operated band brake assembly is adversely effected. The present invention provides a combined draining and brake adjustment means 26 for simultaneously draining such accumulated oil from chamber 23 and also adjusting the brake assembly to insure substantial circumferential contact between lining 15 and the outer periphery of drum 12.

Figure 2:
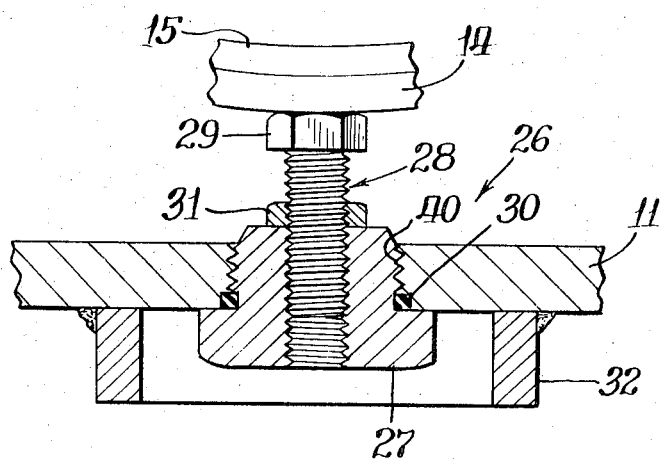
FIG. 2 is an enlarged, sectional view of a combined draining and brake adjustment means employed with the band brake assembly.

Referring to FIG. 2, such means comprises a drain plug 27 threadably mounted exteriorly on a bottom wall of housing 11 and a brake adjustment means or set screw 28. The screw is threadably mounted on the drain plug to dispose an adjustment or enlarged head end 29 thereof interiorly of the housing and in close proximity to band 14. An annular sealing means, such as an O-ring seal 30, is suitably mounted on the drain plug and compressed against housing 11 for sealing purposes. A lock nut 31 is threadably mounted on the shank of screw 28 to positively lock the head of the screw in a pre-set axial position and an annular protective member 32 is secured to the underside of housing 11 to circumvent the head of plug 27 for protection and inadvertent removal purposes.

In operation, the vehicle operator will normally sense, by feel, worn or misadjusted brake linings 15 during operation of the vehicle. The band brake assembly is then readjusted by a serviceman by initially rotating an adjustment rod 33 to move it downwardly along with a bracket secured thereto to tighten the band around drum 12. The lower end of the rod carries a pivot pin 34 mounted on a block 35 which also carries a second pin 36 thereon, secured to the opposite end of band 14. The pivot pins and an associated double-acting linkage 37 function in a conventional manner to selectively actuate the brake assembly by means of an actuating rod 38.

Drain plug 27 is then removed to automatically force the serviceman to drain any oil that may have leaked into chaamber 23 from chamber 20 through a substantially large aperture 40 when the secondary adjustment of screw 28 is made. In particular, lock nut 31 is backed-off and screw 28 is rotated to reset adjustment end 29 thereof so that it will engage band 14 to hold it in a substantially concentric free running relationship with respect to drum 12. The lock-nut is then retightened and the drain plug re-installed to retain the chamber substantially dry and the brake assembly in its readjusted condition of operation.

I claim:

1. In a band brake assembly, at least partially enclosed by a housing, comprising a rotatable drum, a flexible band having a lining secured internally thereon to at least partially circumvent said drum for selective frictional engagement therewith and actuating means operatively connected to said band to selectively clamp and frictionally engage said lining with said drum, the invention comprising combined draining and brake adjustment means comprising a drain plug removably mounted exteriorly on a bottom wall of said housing and brake adjustment means comprising a screw threadably mounted on said drain plug to dispose an adjustement end thereof interiorly of said housing in close proximity to said band to insure uniform braking contact between said lining and said drum and releasable locking means for selectively locking said screw relative to said drain plug.

2. The brake assembly of claim 1 wherein said plug is threadably mounted on the bottom wall of said housing, and said adjustment end constitutes an enlarged head of said screw.

3. The brake assembly of claim 2 wherein said releasable locking means comprises a lock nut threadably mounted on said screw to normally abut said plug to lock the enlarged head of said screw in a pre-set axial position.

4. The brake assembly of claim 1 further comprising annular sealing means mounted on said plug and compressed against said housing for sealing purposes.

5. The brake assembly of claim 1 further comprising a protective member secured to an underside of said housing to circumvent a head of said plug for protection and inadvertent removal purposes.

6. The brake assembly of claim 1 wherein said drum is mounted for rotation on a cross-shaft and wherein said brake assembly is operatively connected in a final drive of a track type vehicle comprising a power input shaft and gear means operatively connected to said cross-shaft to rotate the same in response to rotation of said power input shaft.

7. The brake assembly of claim 6 wherein said gear means and said brake assembly are disposed in adjacent, separated chambers of said housing.

* * * * *